(12) United States Patent
Lin et al.

(10) Patent No.: US 11,656,520 B2
(45) Date of Patent: May 23, 2023

(54) DISPLAYED LIGHT-ADJUSTMENT DEVICE

(71) Applicant: TPK Touch Solutions (Xiamen) Inc., Fujian (CN)

(72) Inventors: Ming Chuan Lin, Taichung (TW); Chun Hui Tseng, Changhua (TW); Su Ming Lin, Taichung (TW)

(73) Assignee: TPK Touch Solutions (Xiamen) Inc., Fujian (CN)

( * ) Notice: Subject to any disclaimer, the term of this patent is extended or adjusted under 35 U.S.C. 154(b) by 233 days.

(21) Appl. No.: 17/065,007

(22) Filed: Oct. 7, 2020

(65) Prior Publication Data

US 2022/0107540 A1 Apr. 7, 2022

(51) Int. Cl.
| | | |
|---|---|---|
| G02F 1/1503 | (2019.01) | |
| G02F 1/01 | (2006.01) | |
| G02B 26/00 | (2006.01) | |
| G02F 1/15 | (2019.01) | |
| G09G 3/19 | (2006.01) | |
| F21V 14/00 | (2018.01) | |
| G02F 1/157 | (2006.01) | |
| E06B 9/24 | (2006.01) | |
| G02F 1/163 | (2006.01) | |
| B60K 35/00 | (2006.01) | |

(52) U.S. Cl.
CPC ............. *G02F 1/157* (2013.01); *B60K 35/00* (2013.01); *E06B 9/24* (2013.01); *G02F 1/163* (2013.01); *B60K 2370/1438* (2019.05); *B60K 2370/1529* (2019.05); *B60K 2370/52* (2019.05); *E06B 2009/2464* (2013.01)

(58) Field of Classification Search
CPC ...... G02F 1/1523; G02F 1/1533; G02F 1/155; G02F 1/0102; G02F 1/163; G09G 3/16
USPC ................ 359/265–275, 277, 245–247, 242; 345/49, 105; 250/70; 348/814, 817; 438/929; 349/182–186
See application file for complete search history.

(56) References Cited

U.S. PATENT DOCUMENTS

| | | | | |
|---|---|---|---|---|
| 2007/0002422 | A1* | 1/2007 | O'Shaughnessy | ...... G02F 1/163 359/265 |
| 2015/0198832 | A1* | 7/2015 | Yang | ..................... G06F 3/0446 445/24 |

(Continued)

FOREIGN PATENT DOCUMENTS

| | | | | | |
|---|---|---|---|---|---|
| CN | 103074966 | A | * | 5/2013 | |
| CN | 104699360 | B | * | 4/2018 | ........... G06F 3/0412 |
| CN | 106125387 | B | * | 7/2019 | ......... G02F 1/13338 |

(Continued)

*Primary Examiner* — Dawayne Pinkney
(74) *Attorney, Agent, or Firm* — Cooper Legal Group, LLC

(57) ABSTRACT

A displayed light-adjustment device includes two light-transmitting layers which are arranged oppositely, a display module, and an adjustable light-shading layer. The display module is stacked between the light-transmitting layers. The adjustable light-shading layer is interposed between the first light-transmitting layer and the display module, and the light transmittance of the adjustable light-shading layer is adjustable. When the adjustable light-shading layer is powered off, the light transmittance of the adjustable light-shading layer is greater than 75%, and when the adjustable light-shading layer is powered on, an ultraviolet resistance value of the adjustable light-shading layer is greater than 99%.

10 Claims, 2 Drawing Sheets

(56) References Cited

U.S. PATENT DOCUMENTS

2017/0123575 A1* 5/2017 Evans .................. G06F 1/1643
2019/0049758 A1* 2/2019 Frischmuth ............ G02F 1/172

FOREIGN PATENT DOCUMENTS

| | | | |
|---|---|---|---|
| CN | 110456973 A | | 11/2019 |
| JP | H1152035 A | * | 2/1999 |
| TW | 201249675 A | | 12/2012 |
| TW | M527018 U | | 8/2016 |
| WO | WO-2020137328 A1 | * | 7/2020 |

* cited by examiner

DISPLAYED LIGHT-ADJUSTMENT DEVICE

BACKGROUND

Technical Field

The present disclosure relates to a displayed light-adjustment device. More particularly, the present disclosure relates to a displayed light-adjustment device for blocking sunlight, insulating heat, and using as a display.

Description of Related Art

In view of the fact that sunlight will pass through a vehicle window and directly hit the face and eyes of a passenger, especially in summer, the strong sunlight makes the passenger feel dazzling and uncomfortable. Thus, one common sun-shielding measure is to stick a traditional heat-insulating film on the vehicle window for sunlight screening or heat insulation.

However, since the brightness (i.e., light transmittance) of the conventional thermal insulation film is constant, the brightness of the vehicle window is unable to be adjusted according to requirements of different environments or timing. In this way, if the heat insulation film is too dark, it will cause visual inconvenience to the passenger. On the contrary, if the heat insulation film is not dark enough, it will not be able to provide shade or heat insulation for the passenger.

In addition, the existing vehicle window is only provided with functions of windproofing, waterproofing, and sand-proofing, but not the function of displaying. Therefore, the vehicle window being used as a display for the passenger cannot be achieved.

SUMMARY

One aspect of the present disclosure is to provide a displayed light-adjustment device to solve the aforementioned problems of the prior art.

In one embodiment of the disclosure, the displayed light-adjustment device includes a first light-transmitting layer, a second light-transmitting layer, a display module, and an adjustable light-shading layer. The second light-transmitting layer is disposed opposite to the first light-transmitting layer. The display module is interposed between the first light-transmitting layer and the second light-transmitting layer. The adjustable light-shading layer is interposed between the first light-transmitting layer and the display module, and the light transmittance of the adjustable light-shading layer is adjustable. When the adjustable light-shading layer is powered off, the light transmittance of the adjustable light-shading layer is greater than 75%, and when the adjustable light-shading layer is powered on, an ultraviolet resistance value of the adjustable light-shading layer is greater than 99%.

According to one or more embodiments of the disclosure, the foregoing displayed light-adjustment device further includes a light sensing unit and a control unit. The light sensing unit is used to sense a light intensity of an incident light entering the first light-transmitting layer. The control unit is electrically connected to the light sensing unit and the adjustable light-shading layer for controlling voltages applied to the adjustable light-shading layer so as to adjust the light intensity of the incident light towards the display module. The control unit applies a specific voltage to the adjustable light-shading layer to adjust the light transmittance of the adjustable light-shading layer according to a sensing result of the light sensing unit.

According to one or more embodiments of the disclosure, in the foregoing displayed light-adjustment device, the display module includes a display panel and a light source module stacked between the first light-transmitting layer and the second light-transmitting layer for providing lights towards the display panel. The control unit electrically controls the adjustable light-shading layer and the light source module to operate synchronously.

According to one or more embodiments of the disclosure, in the foregoing displayed light-adjustment device, the display module further includes a touch panel interposed between the second light-transmitting layer and the display panel.

According to one or more embodiments of the disclosure, in the foregoing displayed light-adjustment device, a reaction time of the adjustable light-shading layer is less than 3 minutes.

According to one or more embodiments of the disclosure, in the foregoing displayed light-adjustment device, the adjustable light-shading layer is one of a polymer liquid crystal unit, a suspended particle device, or an electrochromic unit.

According to one or more embodiments of the disclosure, in the foregoing displayed light-adjustment device, the polymer liquid crystal unit includes a polymer dispersed liquid crystal unit, or the polymer liquid crystal unit includes a polymer network liquid crystal unit.

According to one or more embodiments of the disclosure, in the foregoing displayed light-adjustment device, the electrochromic unit includes a first transparent conductive layer, an electrochromic layer, an electrolyte layer, an ion storage layer, and a second transparent conductive layer that are stacked in sequence. The first transparent conductive layer is directly sandwiched between the electrochromic layer and the first light-transmitting layer, the second transparent conductive layer is directly sandwiched between the ion storage layer and the second light-transmitting layer. When a specific voltage is applied to generate a specific electric field between the first transparent conductive layer and the second transparent conductive layer, a color of the electrochromic layer is changed.

According to one or more embodiments of the disclosure, the foregoing displayed light-adjustment device further includes a window frame. The window frame surrounds and fixes a stacked structure therein. The stacked structure includes the first light-transmitting layer, the adjustable light-shading layer, the display module, and the second light-transmitting layer.

According to one or more embodiments of the disclosure, in the foregoing displayed light-adjustment device, each of the first light-transmitting layer and the second light-transmitting layer is a flexible sheet.

Thus, through the structure of the above embodiments, the disclosure is able to adaptively adjust the light intensity of incident light from the outside in response to the requirements of different environments or timings, so as to choose shading or clarity.

Furthermore, in addition to adaptively adjusting the intensity of incident light from the outside, the disclosure can also be used as a display or a touch display according to the needs of different environments or timings.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the present disclosure, and are incorporated in and constitute a part of this specification. The drawings illustrate embodiments of the disclosure and, together with the description, serve to explain the principles of the disclosure. In the drawings.

DETAILED DESCRIPTION

Figure 1:
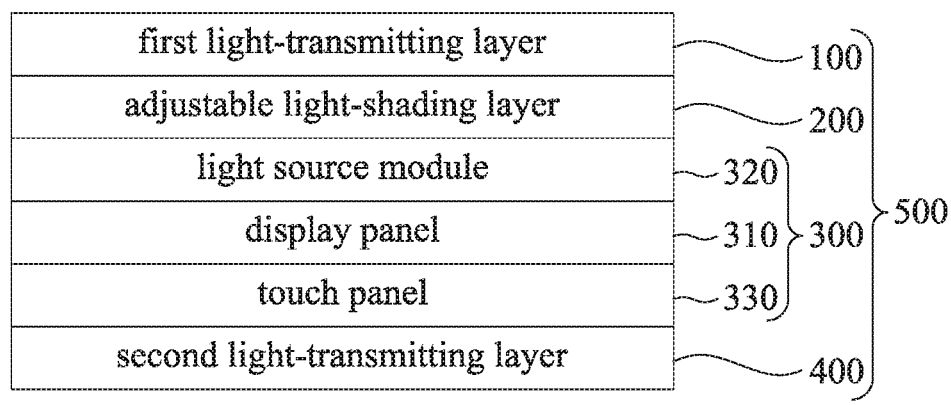
FIG. 1 is a schematic side view of a displayed light-adjustment device according to one embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 2:
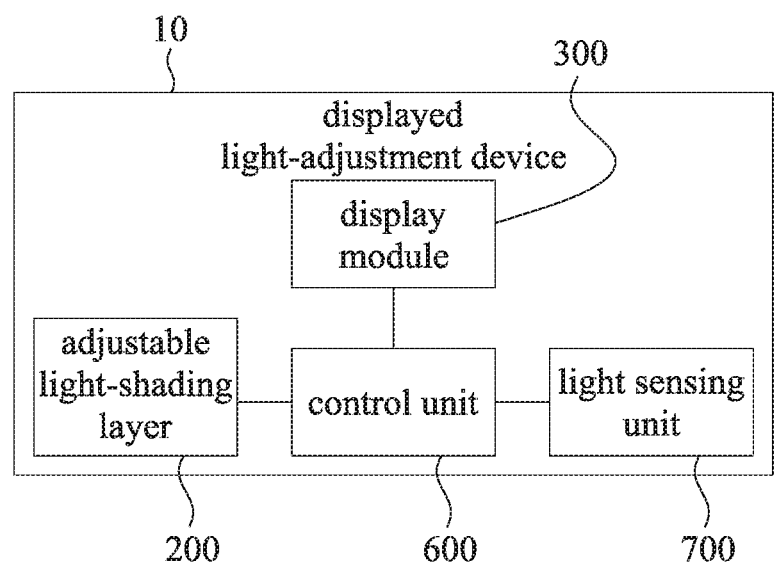
FIG. 2 is a block diagram of the displayed light-adjustment device of the embodiment of the present disclosure.

Reference is now made to FIG. 1 to FIG. 2, in which FIG. 1 is a side view of a displayed light-adjustment device 10 according to one embodiment of the present disclosure, and FIG. 2 is a block diagram of the displayed light-adjustment device 10 of the embodiment of the present disclosure. As shown in FIG. 1 and FIG. 2, in one embodiment, the displayed light-adjustment device 10 includes a first light-transmitting layer 100, a second light-transmitting layer 400, a display module 300, an adjustable light-shading layer 200, and a control unit 600. The first light-transmitting layer 100, the adjustable light-shading layer 200, the display module 300, and the second light-transmitting layer 400 are stacked together to define a stacked structure 500. The second light-transmitting layer 400 is disposed opposite to the first light-transmitting layer 100. The display module 300 is interposed between the first light-transmitting layer 100 and the second light-transmitting layer 400. The adjustable light-shading layer 200, for example, is an electrochromic layer, and is interposed between the first light-transmitting layer 100 and the display module 300. The control unit 600 is electrically connected to the adjustable light-shading layer 200, and the control unit 600 controls voltages to be applied to the adjustable light-shading layer 200 so as to adjust the light intensity of the incident lights towards the display module 300. By controlling a specific voltage to be applied to the adjustable light-shading layer 200, the light transmittance (e.g., color brightness) of the adjustable light-shading layer 200 can be adjusted so as to control the light intensity of an incident light entering the display module 300 from the first light-transmitting layer 100.

More specifically, the displayed light-adjustment device 10 further includes a light sensing unit 700. The light sensing unit 700 is electrically connected to the control unit 600, and the light sensing unit 700 is able to sense the light intensity of the incident light entering the first light-transmitting layer 100. Thus, the control unit 600 controls a specific voltage applied to the adjustable light-shading layer 200 to adjust the light transmittance of the adjustable light-shading layer 200 according to a sensing result of the light sensing unit 700.

In the disclosure, as long as the light sensing unit 700 is able to sense the light intensity of the aforementioned incident light, the light sensing unit 700 is not limited to a specific location. However, the disclosure is not limited thereto. In other embodiments, the disclosure may not require a light sensing unit.

Thus, the control unit 600 is able to adaptively adjust the light transmittance (e.g., color brightness) of the adjustable light-shading layer 200 in response to the requirements of different environments.

For example, when an external light is strong, according to the sensing result of the light sensing unit 700, the control unit 600 reduces the light transmittance of the adjustable light-shading layer 200, so that the passenger sitting at one side of the displayed light-adjustment device 10 approximate to the second light-transmitting layer 400 will not feel the glare of external lights. Conversely, when the external light is not strong or it is night out, the control unit 600 increases the light transmittance of the adjustable light-shading layer 200 or stops operating the adjustable light-shading layer 200, so that the passenger sitting at the side of the displayed light-adjustment device 10 approximate to the second light-transmitting layer 400 is allowed to see through the displayed light-adjustment device 10.

Also, the display module 300 includes a display panel 310 and a light source module 320. In the embodiment, the light source module 320 is disposed between the adjustable light-shading layer 200 and the display panel 310 to provide display lights to the display panel 310 for supplementing the natural light source. Thus, when there is a lack of natural light, the display effect of the display module 300 will not be affected. The control unit 600 electrically controls the adjustable light-shading layer 200 and the light source module 320 to operate synchronously. For example, the control unit 600 electrically controls the adjustable light-shading layer 200 and the light source module 320 to operate synchronously. However, the disclosure is not limited thereto, as long as the light source module 320 can provide display lights to the display panel 310. In another embodiment, the light source module 320 may be interposed at any position between the first light-transmitting layer 100 and the second light-transmitting layer 400. However, the disclosure is not limited thereto and, in another embodiment, the light source module 320 may be omitted in the disclosure. In addition, in another embodiment, the light source module 320 may be located above, below, or on the left, right, or either side of the first light-transmitting layer 100 and the second light-transmitting layer 400.

Thus, when the external light is strong, according to the sensing result of the light sensing unit 700, the control unit 600 reduces the light transmittance of the adjustable light-shading layer 200 and activates the light source module 320 to provide adequate light intensity of lights. Thus, the passenger can still watch content being displayed through the display panel 310 while blocking the strong light from outside. Alternatively, when the external light is adequate, according to the sensing result of the light sensing unit 700, the control unit 600 increases the light transmittance of the adjustable light-shading layer 200 or stops operating the adjustable light-shading layer 200 and shuts down the light source module 320 to stop emitting lights. Thus, the passenger is able to watch the content being displayed through the display panel 310 through ambient light only. Conversely, when the external light is insufficient or night comes, the control unit 600 increases the light transmittance of the adjustable light-shading layer 200 or stops operating the adjustable light-shading layer 200 and activates the light source module 320 to provide adequate light intensity of lights. Therefore, when ambient light is insufficient, the user can still watch the content being displayed through the display panel 310.

For example, the display panel 310 includes an array substrate, an opposite substrate, and a liquid crystal layer (not shown in figures). The liquid crystal layer is interposed between the array substrate and the opposite substrate. Therefore, by applying voltage to generate an electric field on the liquid crystal layer, the orientation of the liquid crystal molecules of the liquid crystal layer and the polarization of the incident light are determined to display images. In addition, the light source module 320 may also be, for example, a front light module. For example, the light source module 320 includes a light emitting unit and a light guide module. The light-emitting unit is, for example, a light-emitting diode, a miniature light-emitting diode, an organic light-emitting diode, or the like. The light guide module is, for example, a light guide plate, a diffuser, etc.

Also, the display module 300 further includes a touch panel 330. The touch panel 330 is electrically connected to the control unit 600 or other control chip. The touch panel 330 is interposed between the second light-transmitting layer 400 and the display panel 310 in order to provide users with an intuitive to operate man-machine interface to meet the needs of users.

In the embodiment, when the adjustable light-shading layer 200 is powered off, the light transmittance of the adjustable light-shading layer 200 is greater than 75%, for example, between 75% to 99% (e.g., to visible light having a wavelength between 400 nm and 700 nm). The reaction time of the adjustable light-shading layer 200 is less than 3 minutes, for example, between 1 minute to 3 minutes. When the adjustable light-shading layer 200 is powered on, an ultraviolet resistance value of the adjustable light-shading layer 200 is greater than 99%, for example, between 99% to 99.99%. For example, the adjustable light-shading layer 200 is a polymer liquid crystal unit. Furthermore, the polymer liquid crystal unit includes a polymer dispersed liquid crystal (PDLC) unit or a polymer network liquid crystal (PNLC) unit. However, the disclosure is not limited thereto. When the polymer dispersed liquid crystal (PDLC) unit receives electrical power, the polymer dispersed liquid crystal (PDLC) unit becomes transparent; otherwise, when the polymer dispersed liquid crystal (PDLC) unit stops receiving electrical power, the polymer dispersed liquid crystal (PDLC) unit returns to its original state to return to the off-white state. On the contrary, when the polymer network liquid crystal (PNLC) unit receives electrical power, the polymer network liquid crystal (PNLC) unit becomes off-white; otherwise, when the polymer network liquid crystal (PNLC) unit stops receiving electrical power, the polymer network liquid crystal (PNLC) unit returns to being transparent. Thus, with the characteristics of the polymer dispersed liquid crystal (PDLC) unit or the polymer network liquid crystal (PNLC) unit, the displayed light-adjustment device 10 can maintain the display effect only with a natural light source and without the use of a polarizer. It also has a visual penetrating effect when the display module 300 is not displayed, thereby not hindering the passenger from viewing of the outside scenery.

The following table is used to illustrate various operation modes of the first light-transmitting layer 100, the adjustable light-shading layer 200, the light source module 320, the display panel 310, the touch panel 330, and the second light-transmittina layer 400.

| | operation modes | | | | |
| --- | --- | --- | --- | --- | --- |
| structure | simply shading when sun-light is strong | display operation when sun-light is strong | simply enjoying external scenery in sunny day | display operation in sunny day | display operation at night |
| first light-transmitting layer 100 | | | | | |
| adjustable light-shading layer 200 | powered on | powered on | powered off | powered off | powered off |
| light source module 320 | powered off | powered on | powered off | powered off | powered on |
| display panel 310 | powered off | powered on | powered off | powered on | powered on |
| the touch panel 330 | powered off | powered on | powered off | powered on | powered on |
| the second light-transmitting layer 400 | | | | | |

However, the disclosure is not limited thereto. In other embodiments, the adjustable light-shading layer 200 may also be a suspended particle device (SPD) or an electrochromic unit (EC).

Figure 3:
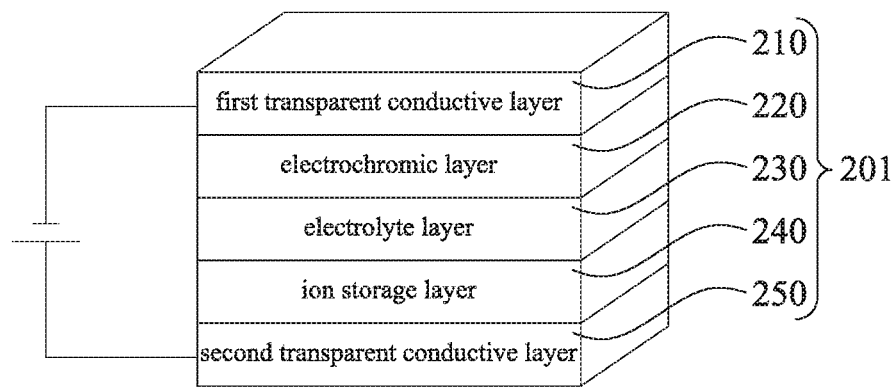
FIG. 3 is a schematic view of an electrochromic unit of the displayed light-adjustment device according to one embodiment of the present disclosure.

FIG. 3 is a schematic view of an electrochromic unit of the displayed light-adjustment device 10 according to one embodiment of the present disclosure. As shown in FIG. 3, for example, the adjustable light-shading layer 201 is an electrochromic unit (EC). In detail, the electrochromic unit is a sandwich-layered structure, and the electrochromic unit includes a first transparent conductive layer 210, an electrochromic layer 220, an electrolyte layer 230, an ion storage layer 240, and a second transparent conductive layer 250 that are stacked in sequence. The first transparent conductive layer 210 is directly sandwiched between the electrochromic layer 220 and the first light-transmitting layer 100, and the second transparent conductive layer 150 is directly sandwiched between the ion storage layer 240 and the second light-transmitting layer 400. When a specific voltage is applied to the first transparent conductive layer 210 and the second transparent conductive layer 250 to generate a specific electric field between the first transparent conductive layer 210 and the second transparent conductive layer 250, due to a redox reaction occurring under the action of the electric field, a color of the electrochromic layer 220 is changed correspondingly, which in turn affects the light transmittance of the adjustable light-shading layer 201 (e.g., color brightness).

It is noted, the material of the electrochromic unit includes inorganic materials and/or organic materials. The inorganic materials are, for example, transition metal oxides and Prussian blue. The organic materials are, for example, organic compounds and polymers.

Figure 4:
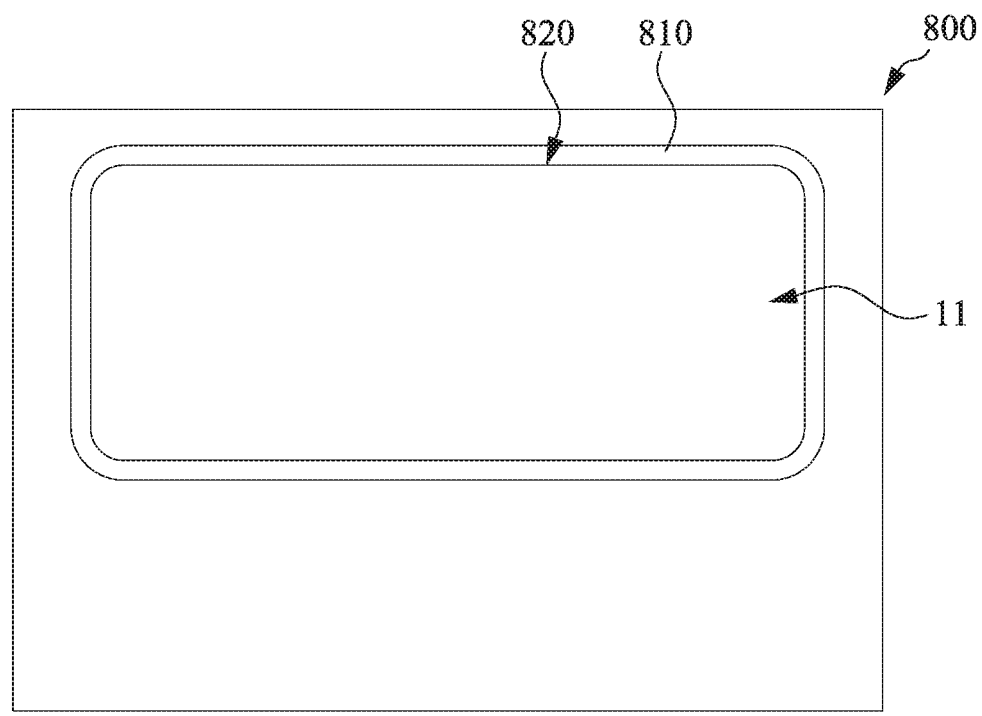
FIG. 4 is a schematic view of the displayed light-adjustment device applied to a window frame according to one embodiment of the present disclosure.

FIG. 4 is a schematic view of a displayed light-adjustment device 11 applied to a window frame 810 according to one embodiment of the present disclosure. As shown in FIG. 4, for example, the displayed light-adjustment device 11 is applied to a vehicle window 800. Furthermore, the displayed light-adjustment device 11 includes a window frame 810. The window frame 810 surrounds and fixes the aforementioned stacked structure 500 therein. The stacked structure 500 is located in an opening 820 of the window frame 810 in which the second light-transmitting layer 400 faces the interior space of the vehicle, and each of the first light-transmitting layer 100 and the second light-transmitting layer 400 can be the transparent glass of the conventional car window. However, the disclosure is not limited to this. In other embodiments, besides car use, the displayed light-adjustment device 11 may also be used on a building window or a building partition for home or office application.

It is noted, in all the embodiments above, any two neighboring ones of the first light-transmitting layer 100, the adjustable light-shading layer 200 or 201, the display module 300, and the second light-transmitting layer 400 of the above-mentioned stacked structure 500 are fixed and attached to each other by water glue (not shown in figures), and the above-mentioned stacked structure 500 is fixed together through a sealant structure (not shown), so that the sealant structure wraps to surround all sides of the stacked structure 500. However, the disclosure is not limited to thereto. The first light-transmitting layer 100 and the second light-transmitting layer 400 respectively have transparent characteristics. However, the disclosure is not limited thereto. In other embodiments, as long as the first light-transmitting layer 100 and the second light-transmitting layer 400 can be light transmissive, the first light-transmitting layer 100 and the second light-transmitting layer 400 may not be totally transparent.

In addition, in this embodiment, the first light-transmitting layer 100 and the second light-transmitting layer 400 are respectively rigid, and the display module 300 and the adjustable light-shading layers 200, 201 are fixedly sandwiched therein for supporting and carrying the display module 300 and the adjustable light-shading layer 200 and 201. For example, the first light-transmitting layer 100 and the second light-transmitting layer 400 can be one of glass, acrylic, quartz, sapphire, etc.

However, the disclosure is not limited thereto. In other embodiments, the first light-transmitting layer 100 and the second light-transmitting layer 400 may also be flexible sheets, so that the first light-transmitting layer 100 and the aforementioned stacked structure 500 can be integrated into a curable object. The above-mentioned control unit 600 is not limited to any form of hardware (control circuits such as central processing unit (CPU) or graphics processing unit (GPU)), software, or firmware.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A displayed light-adjustment device, comprising:
   a first light-transmitting layer;
   a second light-transmitting layer disposed opposite to the first light-transmitting layer;
   a display module interposed between the first light-transmitting layer and the second light-transmitting layer; and
   an adjustable light-shading layer interposed between the first light-transmitting layer and the display module, wherein a light transmittance of the adjustable light-shading layer is adjustable,
   wherein when the adjustable light-shading layer is powered off, the light transmittance of the adjustable light-shading layer is greater than 75%, and when the adjustable light-shading layer is powered on, an ultraviolet resistance value of the adjustable light-shading layer is greater than 99%.

2. The displayed light-adjustment device of claim 1, further comprising:
   a light sensing unit for sensing a light intensity of an incident light entering the first light-transmitting layer; and
   a control unit electrically connected to the light sensing unit and the adjustable light-shading layer for controlling voltages applied to the adjustable light-shading layer so as to adjust the light intensity of the incident light towards the display module,
   wherein the control unit applies a specific voltage to the adjustable light-shading layer to adjust the light transmittance of the adjustable light-shading layer according to a sensing result of the light sensing unit.

3. The displayed light-adjustment device of claim 2, wherein the display module comprises:
   a display panel; and
   a light source module stacked between the first light-transmitting layer and the second light-transmitting layer for providing lights towards the display panel,
   wherein the control unit electrically controls the adjustable light-shading layer and the light source module to operate synchronously.

4. The displayed light-adjustment device of claim 3, wherein the display module further comprises:
   a touch panel interposed between the second light-transmitting layer and the display panel.

5. The displayed light-adjustment device of claim 1, wherein a reaction time of the adjustable light-shading layer is less than 3 minutes.

6. The displayed light-adjustment device of claim 1, wherein the adjustable light-shading layer is one of a polymer liquid crystal unit, a suspended particle device, or an electrochromic unit.

7. The displayed light-adjustment device of claim 6, wherein the polymer liquid crystal unit includes a polymer dispersed liquid crystal unit; or the polymer liquid crystal unit includes a polymer network liquid crystal unit.

8. The displayed light-adjustment device of claim 6, wherein the electrochromic unit comprises a first transparent conductive layer, an electrochromic layer, an electrolyte layer, an ion storage layer, and a second transparent conductive layer that are stacked in sequence, wherein the first transparent conductive layer is directly sandwiched between the electrochromic layer and the first light-transmitting layer, the second transparent conductive layer is directly sandwiched between the ion storage layer and the second light-transmitting layer, wherein, when a specific voltage is applied to generate a specific electric field between the first transparent conductive layer and the second transparent conductive layer, a color of the electrochromic layer is changed.

9. The displayed light-adjustment device of claim 1, further comprising:

a window frame that surrounds and fixes a stacked structure therein, wherein the stacked structure comprises the first light-transmitting layer, the adjustable light-shading layer, the display module, and the second light-transmitting layer.

10. The displayed light-adjustment device of claim 1, wherein each of the first light-transmitting layer and the second light-transmitting layer is a flexible sheet.

* * * * *